United States Patent [19]

Schwochow et al.

[11] 4,078,939

[45] Mar. 14, 1978

[54] REINFORCING GLASS FIBERS OF ZNO-MGO-AL$_2$O$_3$-SIO$_2$-TIO$_2$

[75] Inventors: Friedrich Schwochow, Leverkusen; Wolfgang Schartau, Odenthal, both of Germany

[73] Assignee: Bayer Aktiengesellschaft, Leverkusen, Germany

[21] Appl. No.: 693,041

[22] Filed: Jun. 4, 1976

[30] Foreign Application Priority Data

Jun. 28, 1975 Germany .............................. 2528916

[51] Int. Cl.$^2$ ........................ C03C 13/00; C03C 5/02; C04B 31/06
[52] U.S. Cl. ........................................ 106/50; 106/52; 106/99
[58] Field of Search ................. 106/50, 52, 99, 15 FP

[56] References Cited

U.S. PATENT DOCUMENTS

| 2,920,971 | 1/1960 | Stookey | 106/52 |
|---|---|---|---|
| 3,218,262 | 11/1965 | deLajarte | 106/52 |
| 3,459,568 | 8/1969 | Rinehart | 106/52 |
| 3,673,049 | 6/1972 | Giffen et al. | 106/50 |
| 3,687,850 | 8/1972 | Gegin | 106/50 |
| 3,736,162 | 5/1973 | Chvalovsky et al. | 106/99 |
| 3,901,720 | 8/1975 | Majumdar | 106/50 |
| 3,904,423 | 9/1975 | Guthrie | 106/50 |

*Primary Examiner*—Winston A. Douglas
*Assistant Examiner*—Mark Bell
*Attorney, Agent, or Firm*—Burgess, Dinklage & Sprung

[57] ABSTRACT

Glass fibers of superior physical properties are produced by drawing at a temperature between about 1250° and 1350° C a melt consisting essentially ZnO-MgO-Al$_2$O$_3$-SiO$_2$-TiO$_2$ of the following approximate composition by weight:

| | |
|---|---|
| ZnO | 15 to 23 % |
| SiO$_2$ | 43 to 52 % |
| Al$_2$O$_3$ | 15 to 23 % |
| MgO | 7 to 12 % |
| TiO$_2$ | 3 to 7 %. |

The fibers are especially suited for use as a reinforcement in a plastic, plaster, cement or low-melting metal structure.

5 Claims, No Drawings

REINFORCING GLASS FIBERS OF ZNO-MGO-AL₂O₃-SIO₂-TIO₂

The present invention relates to reinforcing fibers of the $ZnO-MgO-Al_2O_3-SiO_2-TiO_2$ system, having improved mechanical properties, for use in glass fiber-reinforced plastics.

The fibers of E-glass hitherto widely employed for such composite systems have inadequate mechanical properties for many fields of use in which increased stiffness is a prerequisite. Furthermore, E-glass has very high contents of boric acid, which it would be desirable largely to replace, when manufacturing the glasses, since boric acid is an expensive raw material which is also in short supply. Equally, the necessary fluoride content in these glasses presents a considerable problem from the point of view of the protection of the environment.

A number of other systems have been disclosed for improving the mechanical properties of reinforcing fibers. The book "Modern Composite Materials", published by Broutman and Krok in 1967 describes, on page 306, a system designated "M" glass, which has excellent mechanical properties but contains substantial amounts of BeO, which, because of its toxicity, is ruled out for many applications. Better mechanical properties than E-glass are also offered by the "S" glass, described on page 307, composed of 65% of $SiO_2$, 25% of $Al_2O_3$ and 10% of MgO. Glass fibers which additionally contain CaO or $B_2O_3$ are also known (U.S. Pat. No. 2,334,691 and U.S. Pat. No. 2,571,074). German Patent 2,129,016 describes glasses of the $ZnO-MgO-Al_2O_3-SiO_2$ system, having good mechanical properties and improved adhesion to epoxide resins and polyesters.

In themselves, glasses containing ZnO have been known for a long time. They are in the main used fairly extensively for the manufacture of glass ceramic materials. Thus, inter alia, glasses composed of ZnO, $SiO_2$, $Al_2O_3$ and MgO are also suitable for the manufacture of glass ceramic. For ceraming, it is necessary to add to the glass a sufficient quantity of nucleating agent for the crystallization. In the main, $TiO_2$ and $ZrO_2$ can be used for this purpose according to German Pat. No. 1,045,056.

Such glasses have an extremely high tendency to devitrify, in accordance with their function. However, it is just this tendency to crystallization which gives fibers of very great brittleness when processing these glasses.

It is accordingly an object of the present invention to provide a $ZnO-SiO_2-Al_2O_3-MgO-TiO_2$ glass which is especially suitable for the manufacture of glass fibers.

This and other objects are realized in accordance with the present invention pursuant to which there is provided a melt which can readily be drawn to produce fibers of excellent mechanical properties, the melt having the approximate composition by weight:

| | |
|---|---|
| ZnO | 15 to 23 % |
| SiO₂ | 43 to 52 % |
| Al₂O₃ | 15 to 23 % |
| MgO | 7 to 12 % |
| TiO₂ | 3 to 7 %. |

Glass fibers of this composition according to the invention exhibit a substantial increase in the elastic modulus compared to the known zinc-magnesium-aluminum silicate glass fibers without losing strength as a result of a possible incipient crystallization. In this context, an increase by 10% is already to be regarded as considerable, in view of the advanced state of the art.

In addition, these glasses are free from $B_2O_3$ and F, in contrast to E-glass fibers, and their elastic modulus is, for the same strength, up to 50% higher.

Glass fibers according to this invention have increased alkali-resistance as compared to E-glass fibers, so that they are well suited as reinforcement materials for cement mouldings concrete plastics and plaster, as well as for producing flame-proof textile fabrics.

Best results with respect to their mechanical properties were obtained using glass compositions within the preferred range of

| | | |
|---|---|---|
| ZnO | 18 – 22 % | |
| SiO₂ | 45 – 50 % | |
| Al₂O₃ | 18 – 22 % | |
| MgO | 7 – 10 % | |
| TiO₂ | 3 – 6 % | by weight. |

Glass fibers according to this invention may contain other substances in concentrations of up to about 1% by weight, as these are unavoidable using accessible and inexpensively available raw materials.

To manufacture the glasses and glass fibers according to the invention, easily accessible and inexpensively available raw materials can be used as starting materials. The silica is preferably employed as quartz powder, but it is also possible to use compounds of $SiO_2$ with the other oxides required, that is to say, for example, kaolin, magnesium silicate or zinc silicate. Alumina is introduced into the batches in a more or less hydrated form as the hydroxide (for example as hydrargillite or boehmite), as the hydrated oxide or, calcined, as active alumina. Kaolin can also serve as a source of alumina. The oxides ZnO and MgO are preferentially available, in addition to the silicates already mentioned, as the carbonates or as their calcination products. Rutile has proved most suitable for providing the $TiO_2$ content, but all other forms of titanium dioxide can also be used. A typical batch has, for example, the following composition:

Quartz powder (100% SiO₂): 45 to 50 parts by weight
Hydrargillite (65% Al₂O₃): 28 to 30 parts by weight
Zinc oxide (100% ZnO): 19 to 22 parts by weight
Calcined magnesite (87% MgO): 8 to 12 parts by weight
Rutile (100% TiO₂): 4 to 6 parts by weight The batch is ground and can subsequently be fused continuously or in charges in accordance with the processes customary in the glass industry, in furnaces which are brick-lined or lined with platinum metals. The furnaces can be heated either electrically or by gas burners or oil burners. In a reducing gas atmosphere, a slight brown discoloration of the glasses occurs at times, but this has no adverse influence on the mechanical properties of the fibers.

The fusion temperatures for the glasses according to the invention are between about 1,350° and 1,550° C, preferably between about 1,400° and 1,450° C. Temperatures between about 1,300° and 1,400° C are adequate for refining the melts.

After refining, the melts are allowed to run out, for example onto water-cooled rolls, where they solidify to flakes of 1 – 5 mm thickness. However, it is equally possible to manufacture granules by allowing the melt to run into water, or manufacture marbles on appropriate molding machines.

The fiberizing of the glasses according to the invention to give reinforcing glass fibers is carried out according to the customary processes known, for example, from the manufacture of E-glass fibers, through Pt-Rh noble metal bushings.

The requisite fiber-drawing temperatures are in general 500° to 600° C above the particular dilatometric softening points, i.e. temperatures in the range from about 1,250° to 1,350° C, depending on the composition of the glasses, suffice. The fiber strands obtained are sized in accordance with the known methods and the fiber cakes obtained are converted to rovings, chopped strands or milled fibers and the like.

The manufacture of the fibers is not tied to a particular fiberization process. In addition to the textile fiber process it is also possible to use steam or air-blowing processes, rotary or centrifugal processes.

The mechanical properties are investigated above all by breaking strength measurements on mono filaments. For this purpose, it is best to start from filaments from single tip, bushings, which are tested on a breaking strength testing machine. The values of the tensile strength and of the elastic modulus are calculated from the stress-strain diagrams obtained. To eliminate the effect of sizing, these measurements are as a rule carried out on unsized fibers. Since it is extremely difficult, in the case of unsized fibers, to obtain filaments of which the surface is not damaged, which would be a prerequisite for obtaining maximum strengths, the considerable effort entailed thereby was dispensed with and in the case of all the fibers a substantially equal degree of severe damage was tolerated. Therefore, no special precautions were taken when winding the filaments on rotating drums and subsequently taking them off the winding tubes for the breaking strength measurements. As has been found, the values show relatively little scatter with this technique of preparation, even though, as has been mentioned, their absolute values are substantially below the maximum achievable strengths. The data given here regarding the tensile strengths thus merely indicate the influence of the individual factors relative to one another.

Typical examples of the manufacture of glass and of fiber-drawing are given below. The following starting materials were used for all the experiments:

| | |
|---|---|
| Quartz powder: | 100% $SiO_2$ |
| Pure zinc oxide: | 100% $ZnO$ |
| Hydrargillite (Al hydroxide): | 65% $Al_2O_3$ |
| Calcined magnesite: | 87% $MgO$ |
| Rutile: | 100% $TiO_2$ |

EXAMPLE 1 a. Manufacture of the glass

To manufacture the glass batch, the following were mixed and ground:

45.8 parts by weight of quartz powder,
21.9 parts by weight of zinc oxide,
28.3 parts by weight of hydrargillite
10.5 parts by weight of calcined magnesite and
4.8 parts by weight of rutile.

The mixture was pre-calcined (for 2 hours) at about 1,000° C in a chamotte's crucible and then again crushed and ground. The glass was melted in a platinum crucible at 1,450° C (muffle furnace heated by natural gas). After 3 hours, the melt was poured out onto a water-cooled stainless steel form and the glass rod thus obtained was broken, after cooling, into pieces about 1 - 2 cm long and of about 1 $cm^2$ cross-section. This material was used to manufacture the fibers.

b. Manufacture of the fibers

About 80 - 100 g of the pieces of glass described under
a. were introduced into a Pt-Rh single-orifice bushing and melted in the bushing at 1,370° to 1,400° C.

Before filament-drawing, the glass melt was again refined in the bushing for 4 hours to remove gas bubbles. Thereafter, monofilaments of 27 to 29 microns diameter were drawn off at a fiber-drawing temperature of 1,270° C. The filaments had a tensile strength of 0.835 GPa and an elastic modulus of 99.5 GPa.

EXAMPLE 2

The manufacture of the glass and of the fibers was carried out completely analogously to the embodiment described in Example 1. The following quantities were employed:

46.0 parts by weight of quartz powder
19.7 parts by weight of zinc oxide
30.0 parts by weight of hydrargillite
11.1 parts by weight of calcined magnesite and
5.1 parts by weight of rutile Fibers of 29 to 30 microns diameter were drawn from the melt at 1,290° C. The filaments had a tensile strength of 0.872 GPa and an elastic modulus of 99.3 GPa.

EXAMPLE 3

The following quantities of starting materials were used to manufacture the glass:

48.5 parts by weight of quartz powder,
19.3 parts by weight of zinc oxide,
29.8 parts by weight of hydrargillite,
8.9 parts by weight of magnesite and
5.1 parts by weight of rutile.

In other respects, the process was carried out as in Example 1.

The filament-drawing temperature of the glass was 1,330° C. The fibers had a diameter of 27 microns and had the following mechanical properties:

| | |
|---|---|
| Tensile strength: | 1.225 GPa |
| Elastic modulus: | 103.3 GPa |

EXAMPLE 4

In this instance, the glass was melted from the following quantities of starting materials:

48.1 parts by weight of quartz powder,
19.3 parts by weight of zinc oxide,
29.7 parts of hydrargillite,
10.9 parts by weight of magnesite and
3.8 parts by weight of rutile.

Fibers were produced from the glass as in Example 1. The filament-drawing temperature was 1,310° C. Fibers of 25 - 26 microns diameter were obtained, which had the following mechanical properties:

| | |
|---|---|
| Tensile strength: | 1.063 GPa |
| Elastic modulus | 97.5 GPa |

Table 1 gives a summary of Examples 1 to 4. The table also includes the values of the transformation points and dilatometric softening points of the glasses.

Table 1:

Summary of the properties of the glasses and the reinforcing glass fibers accordng to the invention:

| Ex-ample No. | Composition of the glass (in % by weight) | | | | | Characteristic temperatures of the glasses (in° C) | | | Mechanical properties of the glass fibers | |
|---|---|---|---|---|---|---|---|---|---|---|
| | % ZnO | % $SiO_2$ | % $Al_2O_3$ | % MgO | % $TiO_2$ | Transformation point | Dilatometric softening point | Fiber-drawing temperature | Tensile strength (GPa) | Elastic modulus (GPa) |
| 1 | 21.9 | 45.8 | 18.4 | 9.1 | 4.8 | 717.5° | 769.0° | 1270° | 0.835 | 99.5 |
| 2 | 19.7 | 46.0 | 19.5 | 9.7 | 5.1 | 718.0° | 768.0° | 1290° | 0.872 | 99.3 |
| 3 | 19.3 | 48.5 | 19.4 | 7.7 | 5.1 | 718.0° | 773.5° | 1330° | 1.225 | 103.3 |
| 4 | 19.3 | 48.1 | 19.3 | 9.5 | 3.8 | 715.5° | 759.5° | 1310° | 1.063 | 97.5 |

The following comparison examples show the influence of the $TiO_2$ on the mechanical properties of the glasses.

Comparison Example 1:

A $TiO_2$-free glass of the following composition was melted analogously to the method of Examples 1 to 4:
- 20.0% by weight of ZnO,
- 50.0% by weight of $SiO_2$,
- 20.0% by weight of $Al_2O_3$ and
- 10.0% by weight of MgO.

The transformation point was 741° C and the dilatometric softening point was 785.5° C. It was possible to draw the glass melt at 1,315° C. The filaments showed the following mechanical properties:

| Tensile strength: | 0.882 GPa |
|---|---|
| Elastic modulus | 89.7 GPa |

Comparison Example 2:

A $TiO_2$-free glass of the following composition was melted in accordance with the state of the art:
- 24.0% by weight of ZnO,
- 50.0% by weight of $SiO_2$,
- 21.0% by weight of $Al_2O_3$ and
- 5.0% by weight of MgO.

The glass had a transformation point of 730.5° C and a dilatometric softening point of 779.0° C. The fiber-drawing temperature was 1,375° C. The filaments showed the following mechanical properties:

| Tensile strength: | 0.656 GPa |
|---|---|
| Elastic modulus | 89.8 GPa |

Comparison Example 3:

A glass richer in $SiO_2$, but again free from $TiO_2$, of the following composition was manufactured in accordance with the state of the art:
- 14.0% by weight of ZnO,
- 62.0% by weight of $SiO_2$,
- 17.0% by weight of $Al_2O_3$ and
- 7.0% by weight of MgO.

This glass had a transformation point of 748.5° C and a dilatometric softening point of 800.5° C. It was only processable to filaments at a substantially higher temperature (at 1,440° C). The filaments had the following properties:

| Tensile strength: | 0.392 GPa |
|---|---|
| Elastic modulus | 83.7 GPa |

Comparison Example 4:

The present example shows the unfavorable influence of an excessively high $TiO_2$ content on the elastic modulus.

The glass of modified $TiO_2$ content had the following composition:
- 18.3% by weight of ZnO,
- 45.4% by weight of $SiO_2$,
- 18.3% by weight of $Al_2O_3$,
- 9.0% by weight of MgO and
- 10.0% by weight of $TiO_2$.

The glass showed a transformation point of 733.5° C and a dilatometric softening point of 790.0° C. The fiber-drawing temperature was 1,250° C. The following mechanical values were measured on the filaments:

| Tensile strength: | 0.95 GPa |
|---|---|
| Elastic modulus: | 92.6 GPa |

Table 2 reproduces the values for the $TiO_2$-free glasses together with those for the $TiO_2$-rich glass.

Table 2:

Summary of the physical properties of the comparison glasses and glass fibers

| Comparison Example No. | Composition of the glass (in % by weight) | | | | | Characteristic temperatures of the glasses (in° C) | | | Mechanical Properties of the glass fibers | |
|---|---|---|---|---|---|---|---|---|---|---|
| | % ZnO | % $SiO_2$ | % $Al_2O_3$ | % MgO | % $TiO_2$ | Transformation point | Dilatometric softening point | Fiber-drawing temperature | Tensile strength (GPa) | Elastic modulus (GPa) |
| 1 | 20.0 | 50.0 | 20.0 | 10.0 | 0 | 741.0° | 785.5° | 1315° | 0.882 | 89.7 |
| 2 | 24.0 | 50.0 | 21.0 | 5.0 | 0 | 730.5° | 779.0° | 1375° | 0.656 | 89.8 |
| 3 | 14.0 | 62.0 | 17.0 | 7.0 | 0 | 748.5° | 800.5° | 1440° | 0.392 | 83.7 |
| 4 | 18.3 | 45.4 | 18.3 | 9.0 | 10.0 | 733.5° | 790.0° | 1250° | 0.950 | 92.6 |

It will be appreciated that the instant specification and examples are set forth by way of illustration and not limitation, and that various modifications and changes may be made without departing from the spirit and scope of the present invention.

What is claimed is:

1. A glass fiber consisting essentially of ZnO-MgO-$Al_2O_3$-$SiO_2$-$TiO_2$ of the following approximate composition by weight:

| | |
|---|---|
| ZnO | 15 to 23 % |
| $SiO_2$ | 43 to 52 % |
| $Al_2O_3$ | 15 to 23 % |
| MgO | 7 to 12 % |
| $TiO_2$ | 3 to 7 %. |

2. A glass fiber according to claim 1, of the following approximate composition by weight:

| | |
|---|---|
| ZnO | 18 to 22 % |
| $SiO_2$ | 45 to 50 % |
| $Al_2O_3$ | 18 to 22 % |
| MgO | 7 to 10 % |
| $TiO_2$ | 3 to 6 % |

3. A glass fiber according to claim 1, in the form of a flameproof textile fabric.

4. A process for producing glass fibers of superior physical properties comprising drawing through a Pt-Rh noble metal bushing at a temperature between about 1250° and 1350° C a melt consisting essentially of ZnO-MgO-$Al_2O_3$-$SiO_2$-$TiO_2$ of the following approximate composition by weight:

| | |
|---|---|
| ZnO | 15 to 23 % |
| $SiO_2$ | 43 to 52 % |
| $Al_2O_3$ | 15 to 23 % |
| MgO | 7 to 12 % |
| $TiO_2$ | 3 to 7 %. |

5. A process according to claim 4, wherein the melt is of the following approximate composition by weight:

| | |
|---|---|
| ZnO | 18 to 22 % |
| $SiO_2$ | 45 to 50 % |
| $Al_2O_3$ | 18 to 22 % |
| MgO | 7 to 10 % |
| $TiO_2$ | 3 to 6 % |

* * * * *